United States Patent

Reinheimer

[15] 3,699,323

[45] Oct. 17, 1972

[54] ERROR DETECTING AND CORRECTING SYSTEM AND METHOD

[72] Inventor: Harry J. Reinheimer, Rockville, Md.

[73] Assignee: International Business Machines Corporation, Armonk, N.Y.

[22] Filed: Dec. 23, 1970

[21] Appl. No.: 100,976

[52] U.S. Cl. ....................................................235/153

[51] Int. Cl. ...............................................G06f 11/10

[58] Field of Search ...................235/153; 340/146.1

[56] References Cited

UNITED STATES PATENTS 3,287,546 11/1966 Geller........................235/153

3,342,983 9/1967 Pitkowsky et al..........235/153

OTHER PUBLICATIONS

Sellers, Jr. et al., Error Detecting Logic for Digital Computers, McGraw-Hill Co., 1968, pp. 129- 134, 172- 176.

*Primary Examiner*—Charles E. Atkinson

*Attorney*—Hanifin & Jancin

[57] ABSTRACT

In a digital computer having both arithmetic and logical computational capabilities, an error location and correcting system is disclosed. Errors are located through the use of parity techniques and the errors thus located are corrected through the use of residue techniques.

6 Claims, 20 Drawing Figures

INVENTOR
HARRY J. REINHEIMER
BY John D. Crane
AGENT

FIG. 8
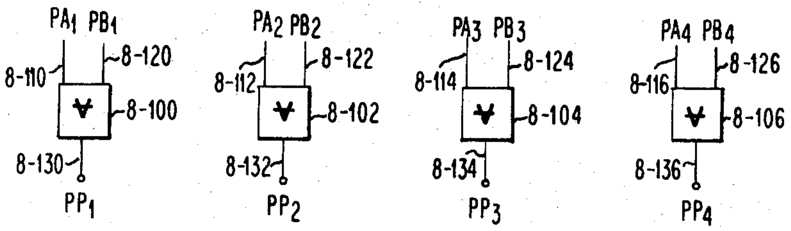
FIG. 9A
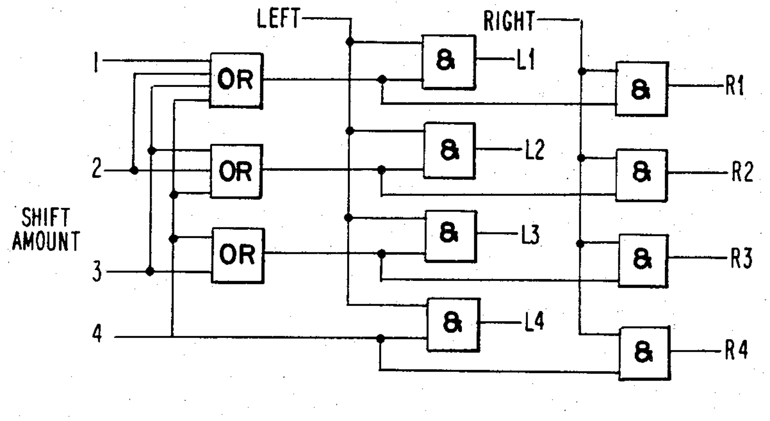
FIG. 13
| | X1' | X2 | X4 | X8 |
|---|---|---|---|---|
| X1 | ZERO SHIFT | SHIFT LEFT 1 RIGHT 7 | SHIFT LEFT 2 RIGHT 6 | SHIFT LEFT 3 RIGHT 5 |
| X16 | SHIFT FOUR LEFT OR RIGHT | SHIFT LEFT 5 RIGHT 3 | SHIFT LEFT 6 RIGHT 2 | SHIFT LEFT 7 RIGHT 1 |

| A | B | $RES_{15}A$ | $RES_{15}B$ |
|---|---|---|---|
| 0110 1110 | 0101 1000 | 0101 | 1101 |

(A V B) = 0111 1110

$RES_{15}$(A V B) = 0110

| | | |
|---|---|---|
| OUTPUT RESIDUE ADDER | 10-26 | 0011 |
| OUTPUT GATE | 10-32 | 0011 |
| OUTPUT HALF ADDER | 10-28 | 0011 0110 |
| OUTPUT RESIDUE CALCULATOR | 10-30 | 1001 |
| OUTPUT GATE | 10-34 | 1001 |
| OUTPUT RESIDUE ADDER | 10-36 | 1100 |
| OUTPUT SHIFT/NO SHIFT | 10-38 | 0110 = $RES_{15}$(A V B) |

(A & B) = 0100 1000

$RES_{15}$(A & B) = 1100

| | | |
|---|---|---|
| OUTPUT RESIDUE ADDER | 10-26 | 0011 |
| OUTPUT GATE | 10-32 | 0011 |
| OUTPUT HALF ADDER | 10-28 | 0011 0110 |
| OUTPUT RESIDUE CALCULATOR | 10-30 | 1001 |
| OUTPUT GATE | 10-34 | 0110 |
| OUTPUT RESIDUE ADDER | 10-36 | 1001 |
| OUTPUT SHIFT/NO SHIFT | 10-38 | 1100 = $RES_{15}$(A & B) |

ERROR DETECTING AND CORRECTING SYSTEM AND METHOD

BACKGROUND OF THE INVENTION

The present invention relates to an improvement to the electronic digital computers and specifically, the improvement relates to the detection and correction of computational errors within such digital computers.

In the field of digital computation, it is very common to have highly complicated electronic circuitry to perform various arithmetic and logical functions which are required in order to allow a digital computer to be a useful tool in business, science and other areas.

Because of the complexity of the electronic circuitry and because of the possibility of certain circuits failing, it becomes highly desirable to be able to determine the correctness of a particular arithmetic or logical operations being performed by a digital computer. As a consequence, large numbers of digital computing devices have been manufactured in the past wherein such computers contain circuitry specifically for the purpose of detecting errors that have occurred.

Parity techniques have often been employed in order to detect the presence of errors in various operations. Parity bits are associated with groups of bits or bytes to denote whether the group or byte contains an even or odd number of bit positions which are in the binary one state. For any given calculational operation, an arithmetic operation or logical connective operation, the parity of the resulting data might be predicted by prediction hardware and calculational hardware might be provided in order to calculate the actual parity of the answer. The predicted and actual parities could then be compared to determine whether or not they are equal. The inequality of the predicted and actual parities would indicate a computational error.

In some digital computer equipment, detected errors have been correctable through the use of numerous error correcting techniques such as the use of error correcting codes and other redundancy codes. Such techniques have been typically characterized by a large number of data bits being required for each number of correctable date bits in error. As a consequence, the cost of such error correcting hardware has been extremely high, thus making error correcting techniques impractical from a cost-performance point of view.

OBJECTS OF THE INVENTION

It is a primary object of this invention to provide a practical and economical means for implementing error detection and correction within digital computers.

It is a further object of this invention to develop an error detecting and correcting system for digital computers which is economically implementable in any electronic technology employed within a given digital computer.

It is yet another object of this invention to produce an error detecting and correcting system for digital computers which employs parity techniques in the detection of computational errors and employs the use of residue techniques in the correction of certain detected errors in computation.

SUMMARY OF THE INVENTION

The above identified objects of the present invention are accomplished through the simultaneous use of parity and residue techniques. Specifically, for each computational operation for which both error detection and correction is desired, a parity predictor is employed to determine the predicted parity of the answer for the given computational operation. A parity calculator is also employed to determine the actual parity of the result of the computational operation. The predicted and actual parities are then compared to determine whether an error has occurred. The bits of the predicted parity word which do not compare with the corresponding bit of the actual parity word indicate the bytes within the answer in which computational errors have occurred.

The error detection and correction of the present invention further employs a residue prediction means which is used to generate a number representative of the predicted residue for a given computational operation. A residue calculating means is further employed to calculate the actual residue of the answer from the given computational operation.

When an error has been indicated through the use of the above described parity techniques and when that error occurs within only one byte in the data word, the difference between the predicted residue and the actual residue is equal to the magnitude of the error within the byte of data in the answer which is indicated to be in error by the lack of a parity check. Through the use of relative magnitudes of the predicted and actual residues, it is possible to determine whether the magnitude of the error should be subtracted or added to the byte in error.

The foregoing and other objects, features, and advantages of the invention will be apparent from the following more particular description of the preferred embodiments of the invention, as illustrated in the accompanying drawings.

FIG. 5*a*, 5*b*, 5*c* and 5*d* show the truth tables for the circuit elements used in the various other circuit diagrams.

Figure 6A:
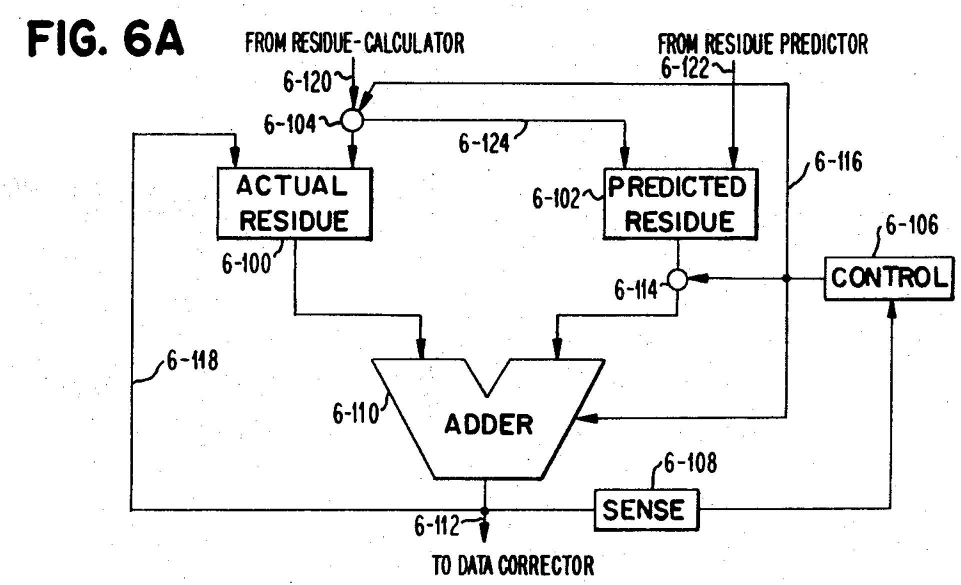

FIG. 6*a* shows an error magnitude calculator.

Figure 6B:
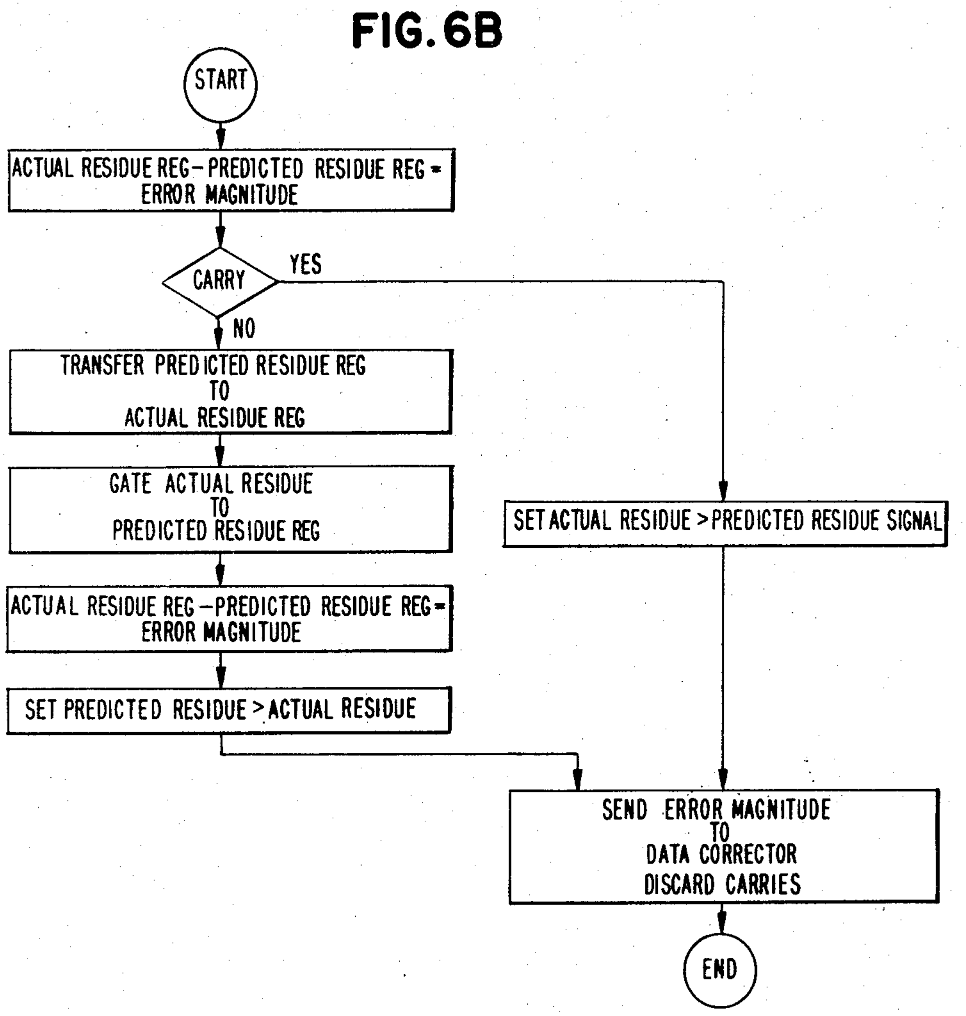

FIG. 6*b* shows a flow chart representation for the control for the error magnitude calculator.

Figure 7A:
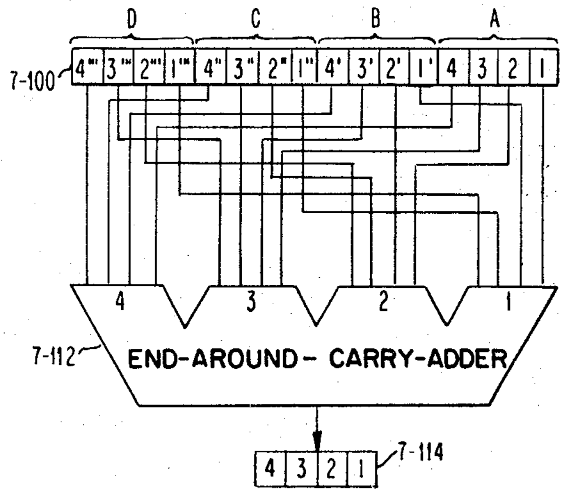

FIG. 7*a* shows an end around carry adder.

Figure 7B:
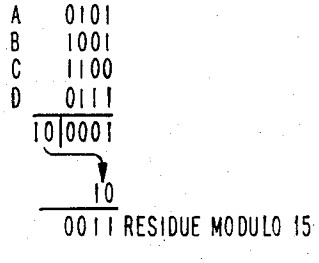

FIG. 7*b* shows a numerical example of the operation for the end around carry adder of FIG. 7*a*.

FIG. 8 shows a parity predictor for EXCLUSIVE OR operations.

Figure 9B:
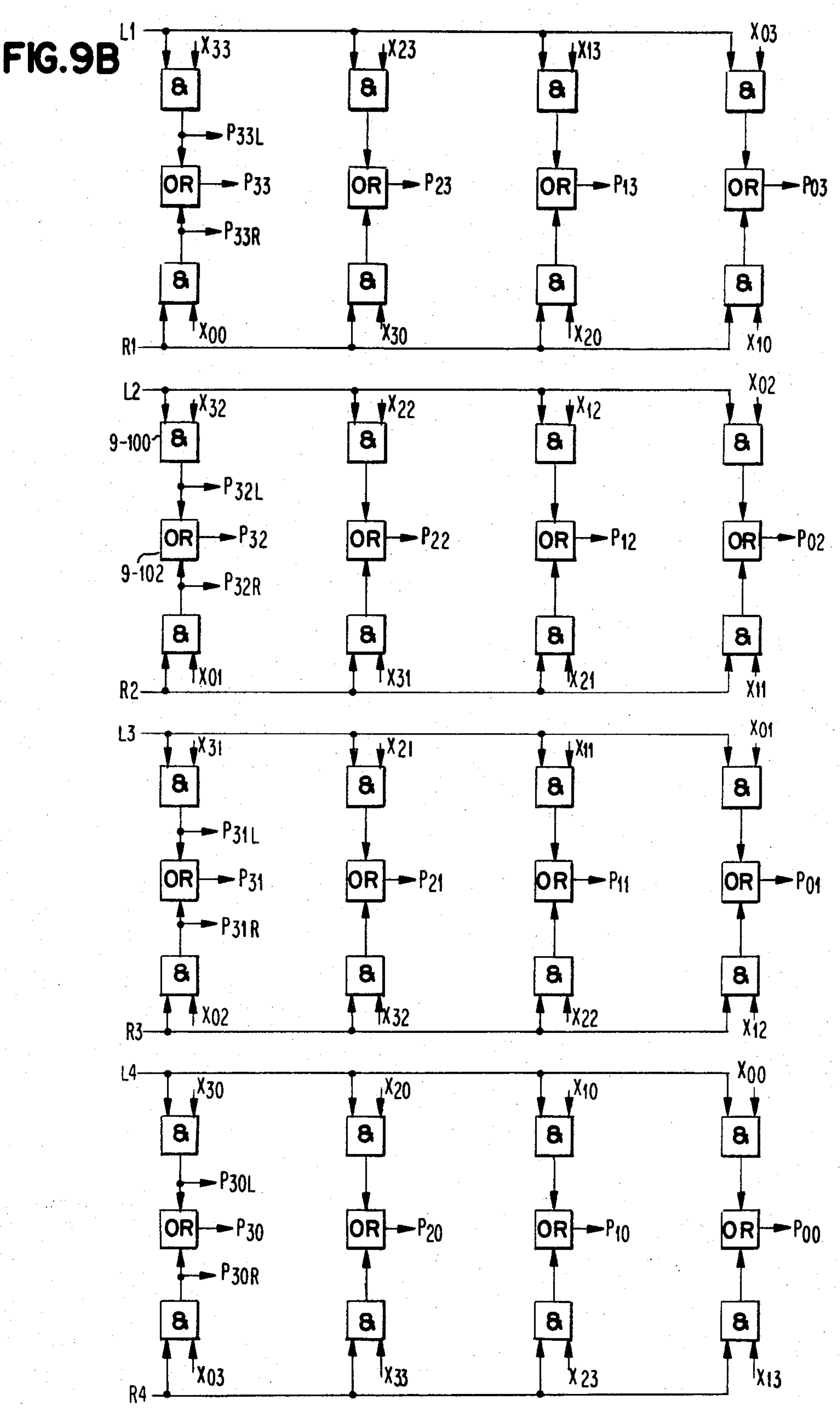
Figure 9C:
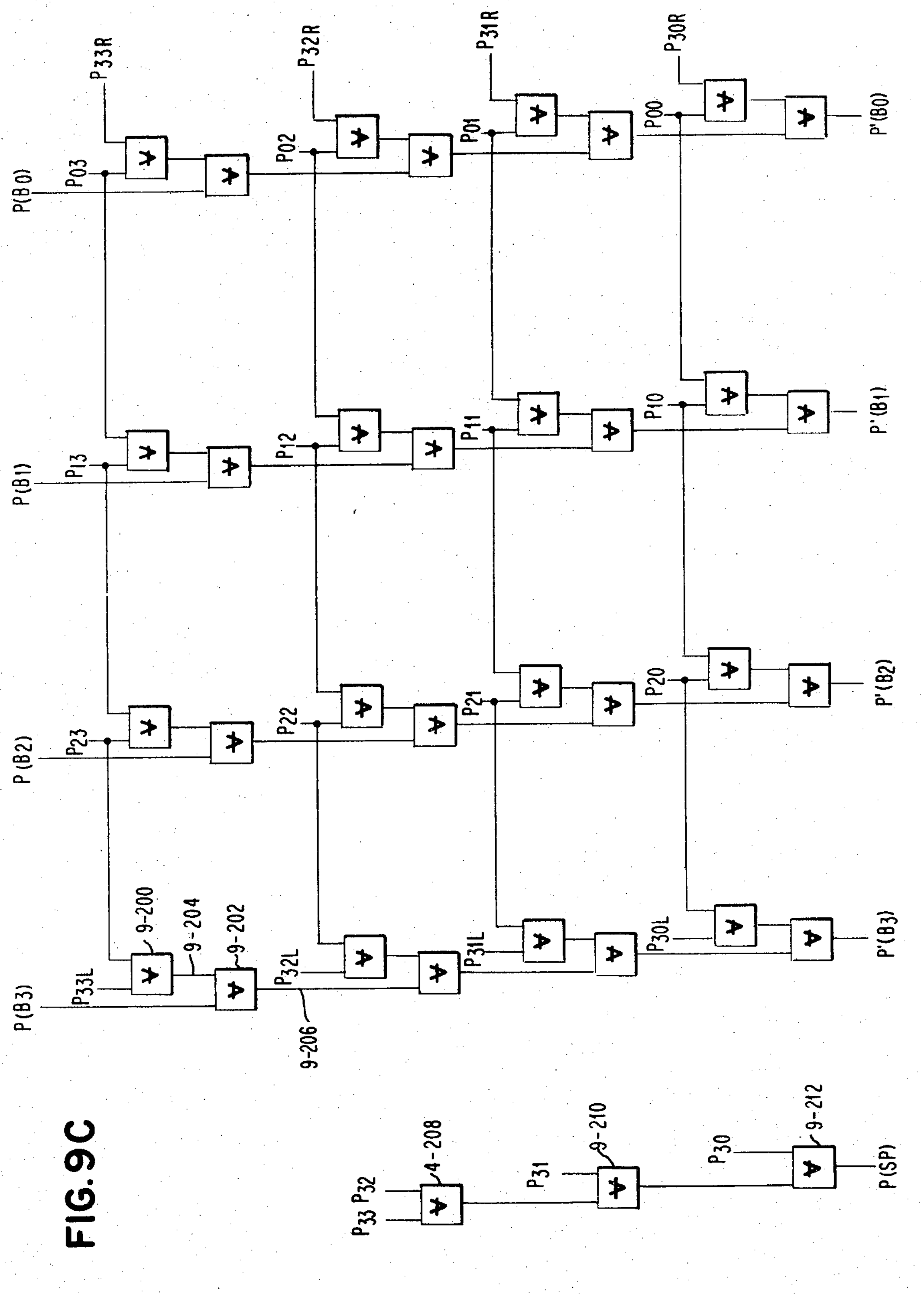

FIG. 9*a*, 9*b* and 9*c* show a parity predictor for shift operations.

Figures 10, 11:
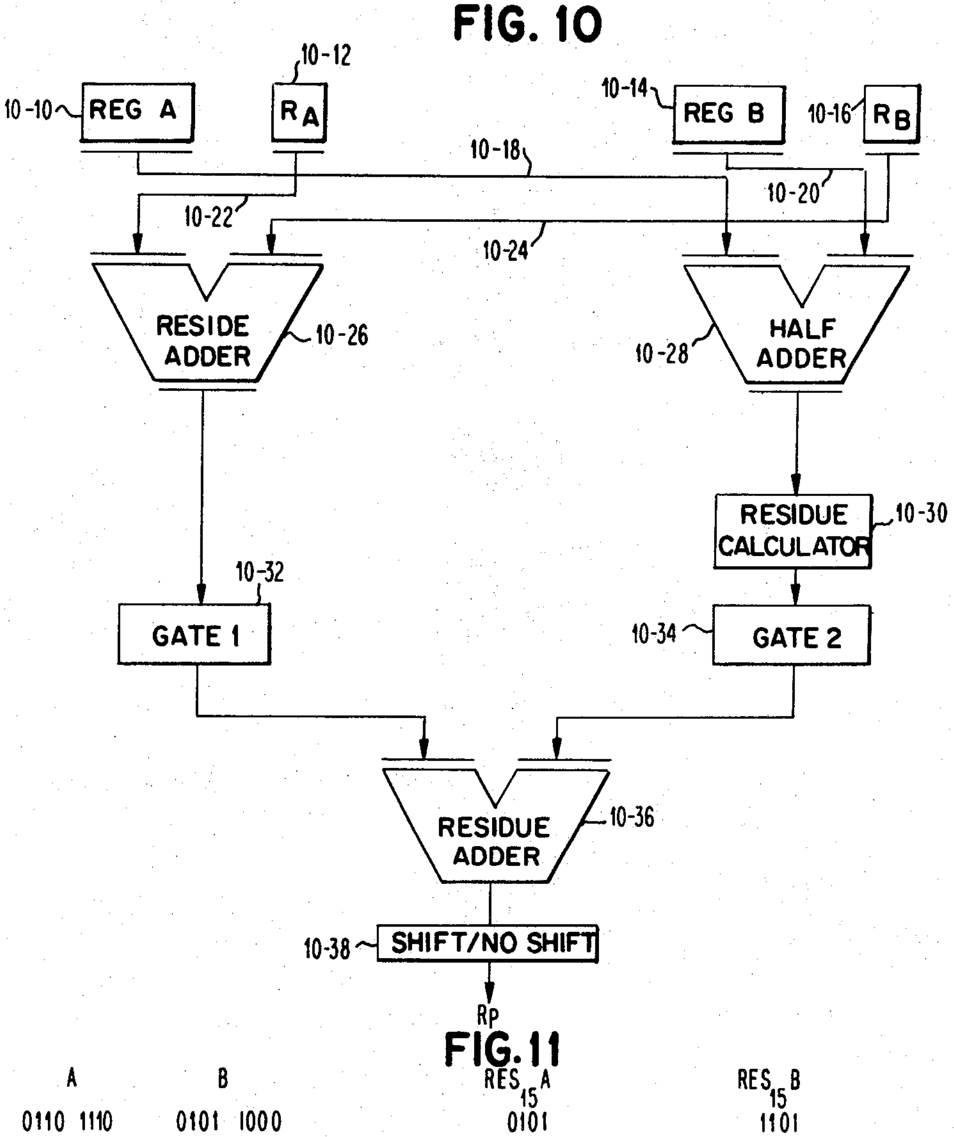

FIG. 10 shows a residue predictor for ADD, AND, OR, and EXCLUSIVE OR operations.

FIG. 11 shows a numerical example of the residue predictor of FIG. 10 for AND and OR operations.

Figure 12:
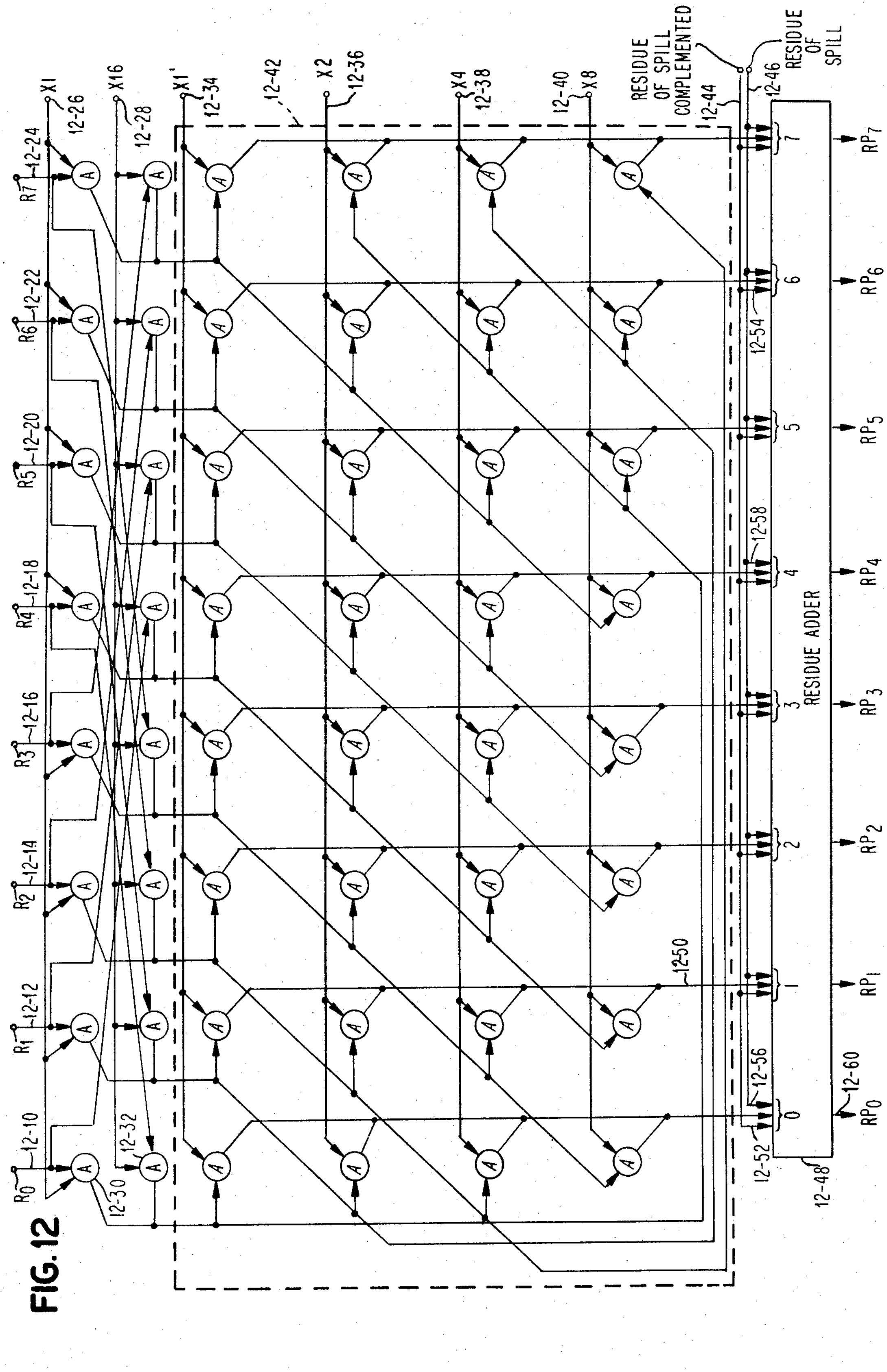

FIG. 12 shows a residue predictor for Shift Operations.

FIG. 13 shows the required gating inputs to FIG. 12 for different Shift amounts and directions.

DETAILED DESCRIPTION

Figure 1:
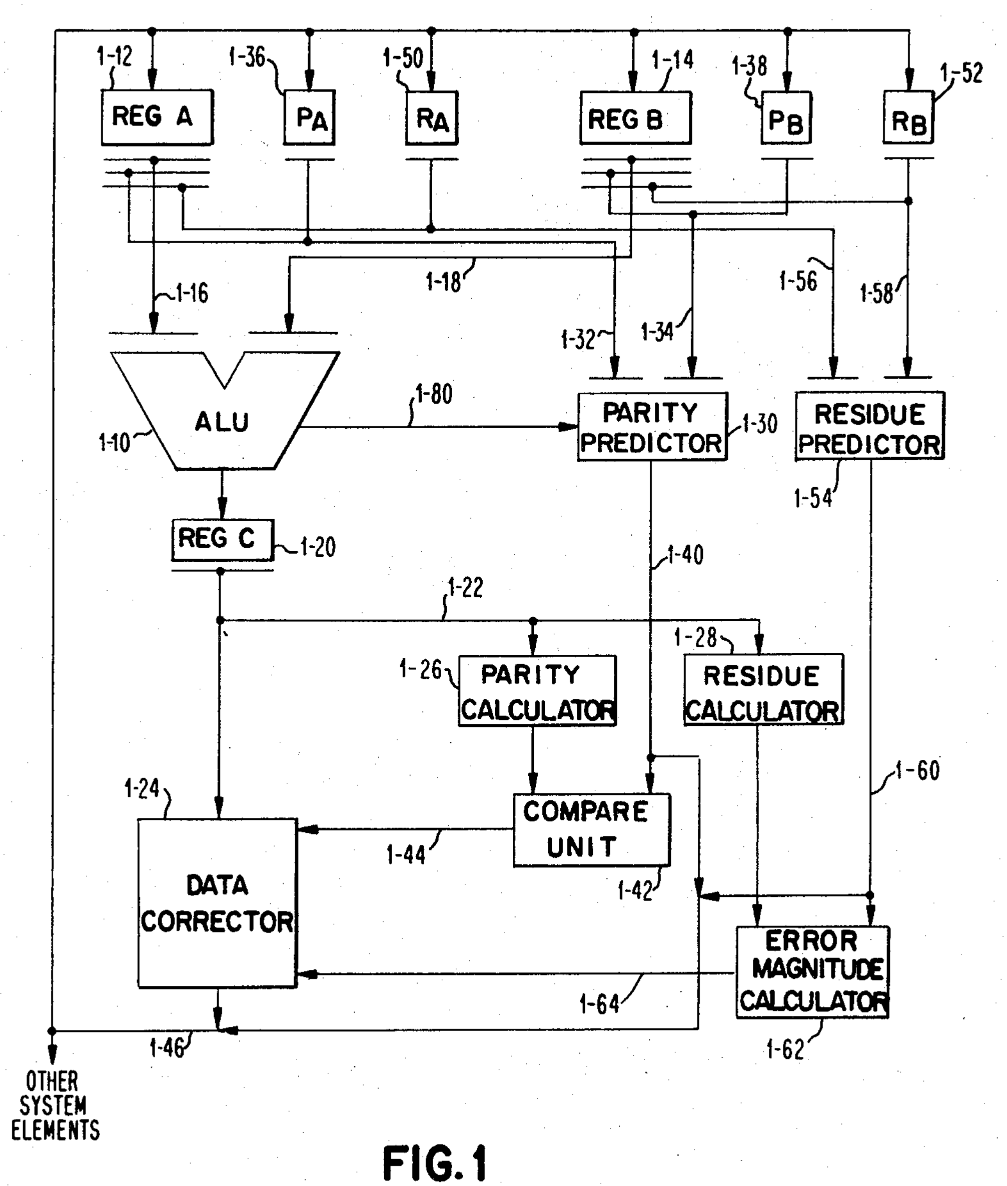
FIG. 1 shows a diagram of the error detection and correction system of the disclosed invention.

Referring to FIG. 1, a system diagram is shown for a digital computer system which includes the necessary elements for performing the error detection and correction as characterized by the present invention. At the core of every digital electronic computer, is some form of calculational element which electronically performs various arithmetic and logical functions, often referred to as an arithmetic-logical unit or ALU, shown as element 1–10 in FIG. 1. The ALU 1–10 of the present invention is capable of performing the following arithmetic and logical operations: add, subtract (complement add), shift, AND, OR and EXCLUSIVE OR. It will be recognized that the characteristics of each of these above identified calculational operations require different types of electronic hardware in order to be implemented, and such types of electronic hardware are well known in the prior art as they are found within most any digital electronic computers.

The ALU 1–10 is connected to two registers, Reg. A 1–12 and Reg. B 1–14, which are the source registers for the operands upon which ALU 1–10 performs the desired calculational operation selected by an external control. The source registers, Reg. A 1–12 and Reg. B 1–14, have data busses 1–16 and 1–18 respectively associated therewith for transmitting electronic data from the registers to the inputs of the ALU 1–10. The output of ALU 1–10 is placed in Reg. C 1–20. The output of ALU 1–10 represents the result of the calculational operation performed by the ALU upon the data contained in the source registers. For example, the contents of Reg. C 1–20 might be the sum of the contents of Reg. A 1–12 and Reg. 1–14.

Associated with each of the source registers is a parity register. Parity Reg. $P_A$ 1–36 is associated with Reg. A 1–12 and parity Reg. $P_B$ 1–38 is associated with Reg. B 1–14. The parity registers contain data bits which are used to indicate whether the bytes of data in the associated register contain an even or an odd number of data bits having a binary value of 1. During each calculational operation that is performed by ALU 1–10, a parity predictor 1–30 is operational to calculate the parity expected upon the data which will be transmitted, to Reg. C 1–20 by the ALU 1–10 upon the completion of the desired calculational operation. The Parity Predictor 1–30 receives data upon input busses 1–32 and 1–34 which are connected to the source registers and the associated parity registers. In some cases, information from ALU 1–10 is used to predict parity and this information is transmitted over data bus 1–80. The parity predictor 1–30 calculates the expected parity for the particular computational operation being performed by ALU 1–10 and transmits the expected parity over data bus 1–40 to a Comparison Unit 1–42.

The answer to the particular computational operation performed by ALU 1–10 which is stored in Reg. C 1–20 is transmitted over data bus 1–22 to a Data Corrector 1–24, a Parity Calculator 1–26 and a Residue Calculator 1–28. The Parity Calculator 1-26 calculates the actual parity of the information representative of the answer for the operation performed by the ALU 1–10. The actual parity calculated by the Parity Calculator 1–26 is transmitted to the Compare Unit 1–42. The Compare Unit 1–42 performs an electronic comparison between the predicted parity as received on data bus 1–40 and the actual parity as received from the Parity Calculator 1–26. Date bus 1–44 transmitts a signal to Data Corrector 1–24 which indicates whether the predicted and the actual parity are identical or different. In the case where there is no difference between the predicted and the actual parity, data bus 1–44 will contain an indication that the predicted parity and the actual parity are identical and that the data contained in Reg. C 1–20 is good and the data should be transmitted uncorrected by Data Corrector 1– 24 to data bus 1–46 and there to be made available to the source registers or to other elements within the digital computer system as controlled by the gating of the external control.

In the case where Comparison Unit 1–42 determines that the predicted parity as received on data bus 1–40 is different from the actual parity as received from the Parity Calculator 1–26, then an indication is transmitted over data bus 1–44 to Data Corrector 1–24 telling which byte is in error.

Associated with each of the source registers is a Residue Register, $R_A$ 1–50 and $R_B$ 1–52. These registers contain a binary representation of the residue for a given modulus of the data contained within the associated source register. For example, Residue Register $R_A$ 1–50 would contain the residue in modulo n, where n is the selected value of the modulus, for the binary data contained within Reg. A 1–12. An excellent discussion of the nature of residue arithmetic and residue applications is contained in the book entitled Residue Arithmetic and Its Applications to Computer Technology by Nicholas S. Szabo and Richard I. Tanaka, published by the McGraw Hill Book Co., Copyright 1967.

The residue contained within the residue registers and the data contained within the source registers are transmitted over data busses 1–56 and –58 to a Residue Predictor 1–54. The Residue Predictor 1–54 calculates the predicted residue for the particular calculational operation being performed by ALU 1–10 and transmits the predicted residue over data bus 1–60 to an Error Magnitude Calculator 1–62. The Error Magnitude Calculator 1–62 also receives from Residue Calculator 1–28 a numerical indication of the actual residue of the data contained within Reg. C 1–20 as a result of the calculational operation performed by ALU 1–10. By taking the magnitude of the difference between the predicted residue and the actual calculated residue, the Error Magnitude Calculator 1–62 is able to determine the magnitude of any error occurring in the calculational operation performed by ALU 1–10 under the assumption that only one byte in the answer contained in Reg. C 1–20 is in error. The magnitude of the error is transmitted over data bus 1–64 to Data Corrector 1–24. The magnitude of the error is combined in the Data Corrector 1–24 along with the data from the Compare Unit 1–42 which indicates which byte is in error. The Data Corrector 1–24 uses this information to adjust the magnitude of the byte in error so as to transmit data onto data bus 1–46 the corrected data when an error occurs in the calculational operation.

In order to more fully explain the operation of the error detecting and correcting capabilities of the systems shown in FIG. 1, it will be useful to examine an example of error detection and correction utilizing this system. In the example it will be assumed that the data flow of the system comprises a total of eight binary bit positions of which there are two bytes, each byte having four bits. A parity bit is assumed to be associated with each byte and the residue selected has a modulus of 15 (the desirability of selecting this particular modulus will be discussed later). The following binary data is assumed to exist in the system registers at the start of an addition operation.

| | | |
|---|---|---|
| Reg. A | 1001 | 1110 |
| $P_A$ | 10 | |
| $R_A$ | 1000 | |
| Reg. B | 1101 | 1010 |
| $P_A$ | 01 | |
| $R_A$ | 1000 | |

Assuming that the ALU 1-10 performs the addition operation of adding the contents of Reg. A 1-12 to the content of Reg. B 1-14, the addition operation would yield in register C the binary number 1 0111 1000. In this particular case, there has been no error in addition and the Parity Calculator 1-26 would calculate the parity of the contents of Reg. C to be the binary quality 00 while Parity Predictor 1-30 would also calculate the predicted parity for the addition operation to be a binary quantity 00. Compare Unit 1-42 would find no difference between the predicted and actual parity and thus no error indication need to be transmitted to Data Corrector 1-24. Thus, the data in Reg. C 1-20 can be transmitted through Data Corrector 1-24 unchanged and onto data bus 1-46.

Assuming that there were an error in the ALU 1-10 in the performance of an addition operation, the system would perform in the following manner. It will be assumed that the actual result of the addition operation as found in Reg. C 1-20 is the following binary result 1 0111 1100. Comparing this result with the correct result shown above, it will be noted that an extra binary bit is found in the lowest order byte and that the added bit has the effect of increasing the calculated answer by four. Because the result contained in Reg. C 1-20 has an even number of bits in the low order byte, the actual parity as calculated by Parity Calculator 1-26 would have the binary value of 01 while the predicted parity would remain the same as for the correct operation and would have the binary value of 00. Compare Unit 1-42 will then transmit a byte in error signal to Data Corrector 1-24.

The problem that now remains is to calculate the magnitude of the error occuring in the low order byte. This calculation of the error magnitude employs the valuable characteristics of residue techniques for error correction. It should be recalled that it was assumed that Residue Register $R_A$ 1-50 contained the residue in modulus 15 of the contents of Reg. A and that Residue Register $R_B$ 1-52 contains the residue in modulus 15 of the contents of Reg. B. It is then possible to predict the expected residue of the answer for the addition operation of the contents of Reg. A to Reg. B using the well known residue arithmetic theorem that the residue $R_A$ added to the residue $R_B$ is equal to the residue $R_C$. Or in other words, if the residue of each of the two operands are added together, the predicted residue of the answer for the addition operation upon the two operands is equal to the sum of the operand residues. Thus, for addition operations, Residue Predictor 1-54 merely has to perform the residue addition of the contents of Residue Register $R_A$ 1-50 to the contents of Residue Register $R_B$ 1-52, the result of that operation under the assumed data indicated above would be transmitted along data bus 1-60 and would have the binary value of 0001. Residue Calculator 1-28 then must calculate the actual residue of the result for the addition operation which is contained in Reg. C 1-20. Using the assumed erroneous result, the actual residue calculated by Residue Calculator 1-28 would have the binary value of 0101.

The Error Magnitude Calculator 1-62 then must perform two distinct functions in order to control the operations of Data Corrector 1-24. In the first place, Error Magnitude Calculator 1-62 must indicate whether the magnitude being transmitted to Data Corrector 1-24 should be subtracted from or added to the byte in error. In the case where the actual residue is greater than the predicted residue, the error magnitude should be subtracted from the byte in error in order to correct the data contained within Reg. C 1-20. In the case where the predicted residue is greater than the actual residue, the error magnitude should be added to the byte in error contained in Reg. C 1-20 in order to perform the error correction. The second function of the Error Magnitude Calculator 1-62 is to determine the difference between the predicted and actual residues. This is done by subtracting the smaller of either the predicted or actual residues from the larger of the predicted and actual residues netting a result which is the numerical difference between the predicted and actual residue and equals the magnitude of the error for the particular operation performed by the ALU 1-10.

In the case of the assumed erroneous result, the predicted residue is smaller than the actual residue as Residue Calculator 1-28 will calculate the residue of the content of Reg. C 1-20 to have a binary value of 0101 while the predicted residue calculated by Residue Predictor 1-54 will have a value of 0001. Since the actual residue is greater than the predicted residue, the predicted residue is subtracted from the actual residue in order to obtain the error magnitude which in the case of the assumed erroneous result would be 0100. Error Magnitude Calculator 1-62 then transmits the error magnitude of 0100 to Data Corrector 1-24 via bus 1-64. Since the actual residue is greater than the predicted residue, Data Corrector 1-24 should subtract the error magnitude received from Error Magnitude Calculator 1-62 from the byte of data in error of Reg. C 1-20 in order to correct the arithmetic operation performed by ALU 110. In this particular case, the binary number 0100 would be subtracted from the binary number 1100 in Data Corrector 1-24, the result of being the binary number 1000 which is the corrected binary value for the low order byte for the addition operation. Data Corrector 1-24 then makes available to the system via data bus 1-46 the corrected results for the addition operation which is 1 0111 1000. Data bus 1-46 also will transmit the predicted residue as received from Residue Predictor 1-54 and the predicted parity as received from Parity Predictor 1–30 so that the correct parity and residue will be transmitted throughout the system as required along with the corrected data for the particular arithmetic or logical operation.

While the above example shows an eight bit data path wherein there are two bytes each having four bits and further where the parity has been selected to have two binary bit positions and each bit being associated with a four bit byte, it will be recognized by those of skill in the art that this is not a limitation to the system in any way. For example, it is perfectly possible to have a data path of, for example, 64 data bits where there are eight data bits to a given byte and where there are eight parity bits, each being associated with one of the eight bytes in the data word.

It turns out, however, that the selection of the most desirable residues for a particular operation in systems for error detecting and correcting as characterized by the present invention is somewhat dependent upon the data word format and the associated parity. It has been found that the most desirable modulus for the error detection and correction system of the present invention is a modulus of the form of $2^n-1$ where $n$ is the number of binary bits in a byte to which a given parity bit is associated. In the example shown above, there are four bits per byte with a given parity bit associated with each byte. The most desirable residue has a modulus of $2^4-1$ or a modulus of 15. The reason for the desirability of choosing the modulus in the form of $2^n-1$ is that the residue of numbers can be very easily calculated from the number itself. The residue is formed by the addition of all the bytes in the data to each other wherein the carries to higher order positions are wrapped around to the low order positions of the adder which performs the residue calculation. Such an adder will be characterized throughout this patent application as a residue adder.

While it may be shown that selecting the modulus in the form of $2^n-1$ is a desirable modulus, it is not a requirement of the present invention that such a modulus be selected. It can be shown that a modulus having a smaller numerical value can be selected, however, the probability that a given error will be corrected properly is reduced by such use of a small residue. It may also be shown that a larger numerical modulus may be used for the residue and can be shown that the probability of proper data correction is somewhat increased although it will become apparent that the calculational hardware, by necessity, becomes greatly more complicated because the residue calculation is not as simple as performing the addition of each of the bytes in the given word.

An additional observation about the characteristics of the system shown in FIG. 1 is that the calculation of the error magnitude and the operations of the data corrector are by necessity rather time consuming. Under normal operation, the parity prediction and parity calculation operations upon the predicted and actual results for the arithmetic or logical operations being performed by ALU 1–10 can be performed at a rather rapid rate so as not to jeopardize the speed of calculation within the system. Thus, the Data Corrector 1–24 need only slow down the calculational speed upon the detection of an error and that the error magnitude calculation need only be performed in situations where an error has been detected by the non-comparison of the predicted and actual parities. Thus, the overall performances of a high speed arithmetic unit in a high speed computer is not affected unless an error is detected.

It is possible to degrade the system performance only a small amount and still achieve a greater effectiveness through the use of the present invention in that it is possible to detect certain errors that are not noticable through normal parity techniques. For example, if a calculational operation should result in an answer where in an even number of bit positions are in error, normal parity techniques will not detect this error condition. However, since the predicted and actual residue can be calculated for the given calculational operation, it is possible to at least determine that there has been an error by utilizing the fact that the predicted and actual residue for the operation should be identical if the operation is performed successfully. Thus, if the predicted and actual residue are different, an error must have occurred even though the parity checking devices might not be able to locate the error.

Figure 2:
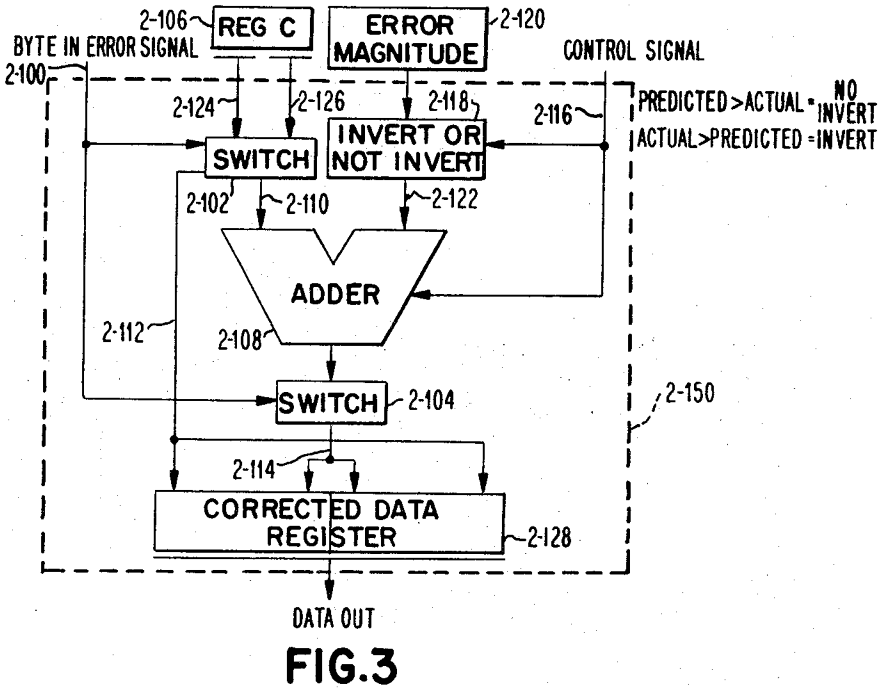
FIG. 2 shows the data corrector for the error detection and correction system of the present invention.

The Data Corrector 1–24 shown in FIG. 1 can be implemented in a number of ways. One specific approach to the implementation of the Data Corrector 1–24 is shown in FIG. 2 and comprises the area inside the dotted lines. Register C 2–106 in FIG. 2 is the same as Register C shown in FIG. 1. Register C 2–106 is assumed to have two bytes of eight bits apiece so as to be consistent with the example previously described. It is, of course, true that Register C 2–106 could contain more or less than two bytes, as required by the system.

In FIG. 1, Compare Unit 1–42 transmits a signal to the Data Corrector which indicates which byte has been determined to contain an error. This signal is shown in FIG. 2 as being transmitted over transmission line 2–100 and the byte in error signal is transmitted to two switches, switch 2–102 and switch 2–104. Switch 2–102 has additional inputs coming from Register C 2–106 over transmission lines 2–124 and 2–126. Switch 2–102 operates so as to transmit over transmission lines 2–112 the correct data byte from Register C 2–106 to the correct data Register 2–128. Switch 2–102 functions under the control of the byte in error signal transmitted over a line 2–100 so as to ensure that the correct data byte in Register C 2–106 is transmitted unchanged over data bus 2–112 to the correct byte position in the correct data Register 2–128. Switch 2–102 also operates to transmit the data byte in error via line 2–110 to the input of adder 2–108.

The Error Magnitude is shown for diagrammatrical purposes in an Error Magnitude Register 2–120. The Error Magnitude is normally transmitted via the Error Magnitude Calculator 1–62 (in FIG. 1) via bus 1–64 (in FIG. 1) to the Data Corrector. This is shown diagrammatically in FIG. 2 by the Error Magnitude Register 2–120 and the associated transmission line shown between Error Magnitude Register 2–120 and the invert/not invert element 2–118. The purpose of the invert/not invert element 2–118 is to allow the capability of the Error Corrector Unit to either add or subtract the error magnitude from the erroneous byte contained in Register C 2–106. The binary subtraction process can be performed by complementing the subtrahend and binarily adding the complement to the byte in error. A final correction of adding a hot one must also be performed in order to ensure that the subtraction results is in the proper numerical result.

A control signal is transmitted via transmission lines 2–116 and is used to indicate whether an addition or subtraction will be performed with regard to the error magnitude and the byte in error. Specifically, when the predicted residue is greater than the actual residue, no inversion is necessary and the error magnitude should be added to the byte in error in order to correct the erroneous data byte. The signal being transmitted over line 2–116 will cause the invert/not invert element 2–118 to pass the error magnitude unchanged to transmission line 2–122 which becomes the second input to adder 2–108. The signal transmitted over 2–116 also goes to adder 2–108 to control the adder operation and allow only a binary addition to occur when a no invert signal has been transmitted over line 2–116.

In the case where the control signal on line 2–116 indicates that the actual residue is greater than the predicted residue, inverter/not inverter element 2–118 must invert or complement the error magnitude and place the inverted error magnitude upon line 2–122 to present the correct data input to adder 2–108 so as to allow the adder to effectively subtract the error magnitude from the data byte in error. The control signal on line 2–116 also goes to adder 2–108 and causes the adder to add a "hot one" so as to make the final correction of the data which is necessary to make an adder perform as a binary subtractor.

Switch 2–104 is at the output of adder 2–108 is under the control of the byte in error signal transmitted over line 2–100. The switch is conditioned in such a manner as to place the corrected data received from adder 2–108 upon line 2–114 and into the proper byte position in the corrected data register 2–128.

It will be clear to those of skill in the art that the above description of the data corrector is merely one possible implementation of the data correction element and that there are hundreds of other possible implementations of the same element. For example, an equivalent data corrector might contain both an adder unit and a subtractor unit which each would be activated upon the receipt of the proper control signals from other elements within the error detecting and correcting system of the present invention. It is further possible that there may be no need for a corrected data register in that the correct data could be directly gated onto the system data bus and that the corrected data byte could be transmitted from the adder output to the system data bus without requiring the operation of a register. It will also be realized by those of skill in the art that other changes in form are readily possible without deviating from the scope of the required functions within the data corrector shown within FIG. 2.

Figure 3:
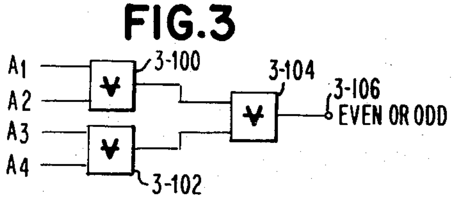
FIG. 3 shows a parity calculator.

Referring again to FIG. 1, an important element of the error detecting and correcting system is the Parity Calculator 1–26. Parity calculation devices are well known in the prior art and can easily be manufactured from simple EXCLUSIVE OR elements. FIG. 3 shows an EXCLUSIVE OR tree which can calculate the parity for a byte of data containing four bits $A_1$, $A_2$, $A_3$ and $A_4$. The data bits are applied to the inputs of two EXCLUSIVE OR elements 3–100 and 3–102. The output of EXCLUSIVE OR elements 3–100 and 3–102 are connected to the input of EXCLUSIVE OR elements 3–104. The output of EXCLUSIVE OR element 3–104 is connected to output point 3–106, the output indicating whether the input to the EXCLUSIVE OR tree has an even or an odd number of binary bits which are in the binary 1 state. Should there be more than four data bits per byte, it will be perfectly clear to those of skill in the art how to modify the EXCLUSIVE OR tree shown in FIG. 3 in order to produce a tree for determining the parity for such a byte of data.

Figure 4:
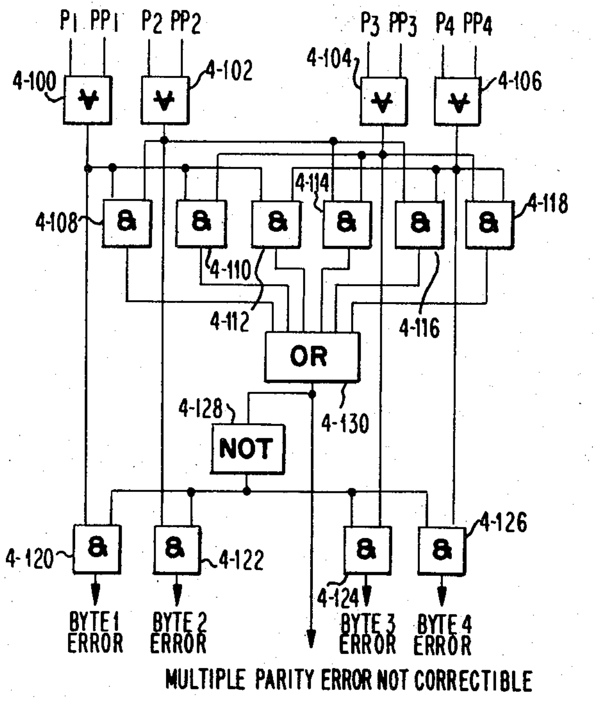
FIG. 4 shows the parity comparison unit.

Referring again to FIG. 1, another important element in the error detecting and correcting capability of the present invention is the Compare Unit 1–42. One particular approach to making a compare unit is shown in FIG. 4. There are several EXCLUSIVE OR elements 4–100, 4–102, and 4–104 and 4–106 at the input to the compare unit shown in FIG. 4. Each of the EXCLUSIVE OR elements has two inputs, one input connected to a parity tree of the type shown in FIG. 3 which indicates the actual parity of the data contained within Register C 1–20 in FIG. 1. These inputs are shown diagrammatically as inputs $P_1$, $P_2$, $P_3$ and $P_4$. Input $P_1$ corresponds to the actual parity calculated upon the data in Register C corresponding to byte number 1. The parity corresponding to byte 2, 3 and 4 are inputted at input points $P_2$, $P_3$, and $P_4$ respectively. It should be noted that the compare unit shown in FIG. 4 has been designed for a system wherein Register C contains four bytes of data. It will be readily recognized by those of skill in the art that very simple modifications can be made to the circuitry in FIG. 4 in order to accommodate more or less bytes of data.

The second input to each of the EXCLUSIVE OR elements mentioned above corresponds to the predicted parity for the given bytes of data contained within Register C. The predicted parity information comes from the Parity Predictor 1–30 shown in FIG. 1. The predicted parity inputs are shown as $PP_1$, $PP_2$, $PP_3$ and $PP_4$. These correspond to the predicted parities of bytes 1, 2, 3 and 4 respectively.

The output of each of the EXCLUSIVE OR elements 4–100, 4–102, 4–104 and 4–106 are connected to the inputs of AND circuits 4–120, 4–122, 4–124 and 4–126 respectively. The outputs of the later mentioned AND circuits generate the signals which are transmitted to the data corrector 1–24 of FIG. 1 and indicate specifically which bytes of the four possible bytes are in error. This byte in error information is utilized, as heretofore mentioned, by Data Corrector 1–24.

Since the error correcting capability of the present system is limited to errors occurring within a single data byte, it is useless to prevent the error signal from being transmitted to the Data Corrector in situations where there are multiple byte errors detected. AND elements 4–108, 4–110, 4–112, 4–114, 4–116 and 4–118 are connected together with OR circuit 4–130 and NOT circuit 4–128 in order to produce a signal which indicates that a multiple byte error has been detected and a second signal is generated which prevents the transmission of signals to the Data Corrector. The output of NOT circuit 4–128 is connected to the inputs of AND circuits 4–120, 4–122, 4–124 and 4–126 and has the effect of not allowing the error signals to be transmitted to the data corrector whenever two or more byte errors are detected. The multiple parity error signal can be utilized in the system for any number of possible functions. It might be used, for example, to make sure that the actual parity and the actual residues are utilized in connection with the data in Register C, thus preventing other error detection circuits within the system from indicating a parity error if the system chooses to ignore the occurrence of the error in the calculational operation. The multiple parity error signal might also be used to indicate to the operator that a multiple error had occurred and that the error was a non-correctable error. Other possible uses for the multiple error indication will also be apparent to those of skill in the art.

FIG. 5 shows the truth table characteristic for each of the individual circuit elements shown in FIG. 3 and FIG. 4. Specifically, FIG. 5*a* shows the truth table for the EXCLUSIVE OR element which is used in the EXCLUSIVE OR tree of FIG. 3 and the input circuitry in FIG. 4. The AND, OR and NOT functions are shown respectively in FIG. 5*b*, FIG. 5*c*, and FIG. 5*d*.

Referring now to FIG. 6*a*, one possible approach to making the Error Magnitude Calculator 1–62 of FIG. 1 is shown. The Error Magnitude Calculator of FIG. 6*a* has a data input but 6–120 for receiving data from the residue calculator. A second data input bus 6–122 receives data from the residue predictor. The data from the residue calculator passes through gate circuit 6–104 on route to the actual residue Register 6–100. The data arriving from the residue predictor passes directly along data but 6–122 to predicted residue Register 6–102.

Control unit 6–106 controls the operation of the system in such a manner as to calculate the error magnitude in accordance with the flow chart shown in FIG. 6*b*. In order to calculate the error magnitude, control unit 6–106 causes the error magnitude calculator to subtract the predicted residue from the actual residue. This is performed by gating the actual residue from Register 6–100 into the left input of adder 6–110 while gating the predicted residue in Register 6–103 through inverter/non-inverter 6–114 to the right input of the adder 6–110. The inverter/non-inverter is conditioned so as to invert the data contained within Register 6–102. The adder then performs a binary addition and then performs a final addition of adding a binary bit into the lowest order bit position of the answer. This, in effect, causes the contents of Register 6–102 to be subtracted from the contents of Register 6–100. The output of the adder is sensed by sensing circuit 6–108 to determine whether there has been a carry out of the high order position of the adder. If there has been a carry sensed by sensing circuit 6–108, this means that the actual residue is greater than the predicted residue and such an indication should be sent to the data corrector unit. If the output of adder 6–110 does contain a carry, the output is equal to the magnitude of the error which is to be corrected. This error magnitude would be transmitted over data bus 6–112 to the data corrector.

Assuming that Sense Circuit 6–108 does not detect a carry, the output of adder 6–110 does not represent the binary magnitude of the error. As a consequence, a transfer of data must occur between Register 6–102 and Register 6–100. Control circuit 6–106 will cause the data in Register 6–102 to be transmitted through inverter/non-inverter 6–114. Inverter/non-inverter 6–114 is conditioned in the non-inverting mode so that the data from Register 6–102 can be transmitted to the right adder input of adder 6–110 without any modification. Adder 6–110 is conditioned so as to pass the data at the right data input unchanged to the output and onto data bus 6–118. The contents of Register 6–102 is thus gated through the adder and into register 6–100 under the control unit 6–106. Control Unit 6–106 transmits a signal over line 6–116 to gate circuit 6–104 which will cause the data from the residue calculator to be gated onto line 6–124 and into Register 6–102. This operation has the effect of swapping the data from Register 6–102 into 6–100 and vice versa. Control unit 6–106 subsequently causes the data in Register 6–100 to be gated from Register 6–102 through inverter/non-inverter 6–114 which is conditioned in the inversion mode to the right input of adder 6–110. Adder unit 6–110 then performs binary addition of the numbers appearing at its respective inputs and additionally adds in a final binary 1 into the lowest order bit position. The output of adder unit 6–110 is then transmitted over data bus 6–112 to the data corrector (the carry from the high order bit position is ignored). Control unit 6–106 also notifies the data corrector that the predicted residue is greater than the actual residue.

It will be recognized by those of skill in the art that there are additional approaches to performing the error magnitude calculation. For example, it will be possible to have a magnitude calculation. For example, it will be possible to have a magnitude detector examine the data from the residue calculator and the residue predictor to determine which of the two numbers was greater in magnitude. Then the numbers might be gated into a subtractor unit in such a manner as to always insure that the output was a positive number. The positive number output would then represent the error magnitude and be transmitted directly to the data corrector. In addition, the magnitude detecting element could transmit signals to the data corrector indicating whether the predicted or actual residue was the larger of the two.

Another possible approach might be to modify the circuitry of FIG. 6*a* in such a manner as to add another inverter/non-inverter between Register 6–100 and adder unit 6–110. This approach would have the advantage of speeding up the operation of calculating the error magnitude because it would not be necessary to perform the transferring of data between Register 6–100 and 6–102 as was previously outlined. It will be clear to those of skill in the art that the above identified modifications are by no means exhaustive of all of the possible deviations and changes which might be made in implementing the error magnitude calculational function.

Referring again to FIG. 1, an important element in the error detecting and correcting system there shown is the residue calculator 1–28. The residue calculator is a relatively simple apparatus for calculating the residue form the data contained in Reg. C 1–20. The residue calculation can be performed in a number of ways. For example, the binary number in Reg. C 1–20 could be divided by the modulus and the remainder of the division process becomes the residue for the given modulus of the number contained within Reg. C. This approach can be taken for any modulus.

In the case where the modulus selected is of the format $2^n-1$, where $n$ is the number of binary bits in a parity checked byte, it is possible to greatly simplify the residue calculator. The residue calculator for a number in a modulus of the form $2^n-1$ simply an end around carry adder which performs the addition either in serial or in parallel of $n$ bit segments of the number. For example, it is possible to calculate the residue of a sixteen bit binary number in modulus fifteen in the following way. The lowest order four bits would first be added to the second lowest order four bits to form a partial answer. The partial answer would then be added to the third lowest order four bits to form a second partial answer. The second partial answer would then be added to the fourth lowest order four bit segment of the word to form a third partial answer. Since three additions have taken place, it is possible for carries to have been generated from the addition. These carries are wrapped around and added to the low order positions of the third partial answer. That is, the lowest order carry would be added to the lowest order bit position of the third partial answer. The next carry position would be added to the second bit position of the third partial answer and so forth. The results of this final addition would be a four bit number representative of the modulo 15 residue of the 16 bit number. This approach could be classified as a serial addition approach to calculating the residue.

A second and far more efficient approach to calculating the residue where the modulus is of the form $2^n-1$ is to use a parallel end around carry adder. FIG. 7*a* shows schematically what an end around carry adder. FIG. 7*a* shows schematically what an end around carry adder circuit and its connections would be. The example there shown is for a device which would calculate the residue modulus fifteen of a sixteen bit binary number. The binary number is contained within a Register 7–100 and has been divided for convenience into four bytes of four bits apiece, the bytes being labeled A, B, C and D. An example of how the end around carry adder would operate upon a binary number is shown in FIG. 7*b* where actual numbers for each of the bytes are shown.

In FIG. 7*a*, each of the lowest order bit positions of each byte enter the lowest order input of end around carry adder 7–112. The second bit position of each of the bytes is placed into a second input to end around carry adder 7–112. The same applies for the third and fourth bit positions.

The end around carry adder 7–112 can be easily implemented using the apparatus shown in U.S. Pat. No. 3,535,502 which was filed Nov. 15, 1967, and entitled Multiple Binary Input Adders. In order to provide the end around carry function, the carries which are generated internally in adders shown in the aforementioned copending application which would be added into the first carry position above the fourth bit position should be connected electrically to form an additional input to the lowest order bit position in the end around carry adder. Carries into the second bit position above the fourth bit should be electrically connected as an additional input to the second bit position of the end around carry adder. In this manner, carries into higher order bit positions are automatically added into the low order bit positions are automatically added into the low order bit position so as to accurately calculate the residue. This end around carry addition feature is shown schematically with numbers in FIG. 7*b*.

Referring again to FIG. 1, the parity predictor 1–30 is an important element of the error detecting and correcting system of the present invention. Without a predicted parity, it would be impossible for the present system to determine in which byte an error has occurred in the operation being performed by ALU 1–10.

The predicting of parity for a given operation is not a simple process. Therefore, the parity predictor 1–30 comprises several sets of hardware where each of the sets is used to calculate the predicted parity for a given arithmetic or logical operation. For example, it is well known in the prior art that there are numerous techniques for predicting the parity which should result from given data as the result of an addition operation upon two sets of input data. One particular approach to checking binary adders is shown in U.S. Pat. No. 3,342,983. The apparatus there shown is used in the prediction of parity for addition as well as subtraction operations within a given arithmetic and logical unit. The material contained in the above identified patent is by no means exhaustive of the approaches taken in the prior art to predicting parity for arithmetic operations and the materials contained therein are mentioned only as one possible example for performing that particular function of parity prediction.

Since it is an object of the present invention to be able to detect and correct errors for both arithmetic and logical functions, it is necessary for the parity predictor 1–30 to predict the parity for EXCLUSIVE OR operations. Such a predictor is shown in FIG. 8 and comprises basically an EXCLUSIVE OR circuit for each of the parity bits representative of the parity of bytes of data which are to be EXCLUSIVE OR together.

Referring momentarily to FIG. 1, it should be noted that data bus 1–32 comprises one input to parity predictor 1–30 and contains data from parity Register $P_A$ 1–36. The data received from this parity register represents the parity for the bytes of data contained within Register A 1–12. It will be assumed, for the time being, that the system has four bytes of data contained within Register A 1–12 and there are, as a consequence, four parity bits contained within parity Register $P_A$ 1–36. The same will be assumed to apply to Register B 1–14 and its associated parity register $P_B$ 1–38.

Figure 5A:
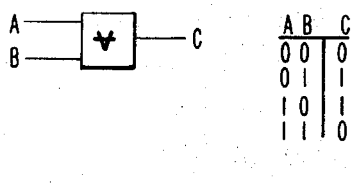
Figure 5B:
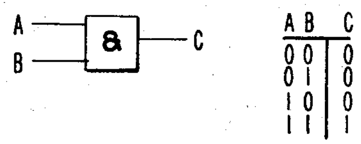
Figure 5C:
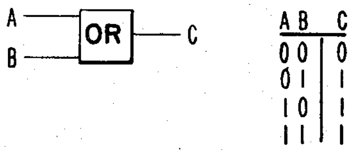
Figure 5D:
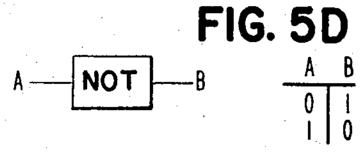

The parity bit for byte 1 of Register A 1–12 is shown entering the EXCLUSIVE OR parity predictor of FIG. 8 on line 8–110 and is diagrammatically represented by $PA_1$. The parity bits for bytes 2, 3 and 4 enter the EXCLUSIVE OR parity predictor in FIG. A on lines 8–112, 8–114 and 8–116 respectively and are represented by $PA_2$, $PA_3$ and $PA_4$. The parity bits for the data contained in Register B are transmitted over lines 8–120, 8–122, 8–124 and 8–126. The above identified lines are connected as shown in FIG. 8 to EXCLUSIVE OR elements 8–100, 8–102, 8–104 and 8–106. These EXCLUSIVE OR elements perform the logical function as represented in FIG. 5*a*.

In FIG. 8, the predicted parity for byte one of the EXCULSIVE OR operation as performed on the data in Register A and Register B would appear on line 8–130 and is represented as $PP_1$. The predicted parities for bytes 2, 3 and 4 appear on lines 8–132, 8–134 and 8–136.

Another function for which parity prediction is necessary is the shift function. The circuitry which will be discussed relates to a parity predictor which is capable of predicting the parity for shift operations where the shift output word has four bits per byte and a parity bit associated with each of four bytes. It will be clear to those of skill in the art that the techniques here in described can be easily expanded to encompass either more bytes or more bits per byte.

Referring now to FIG. 9*a*, a portion of the shift operation parity predictor is shown. The circuitry of FIG. 9*a* is used to develop various signals; namely, L1, L2, L3, L4, R1, R2, R3 and R4. These signals are utilized by the various selection circuits shown in FIG. 9*b*. The inputs to FIG. 9*a* represent data indicating whether a shift is to be in the left or right direction. A second set of inputs indicates the amount of the shift in bit positions. For the specific hardware to be shown, the shift operation is capable of shifting the data over a maximum of four binary bit positions in either the left or the right direction and the original unshifted data is comprised of four bytes with four bits per byte. When the arithmetic operation of the ALU calls for a left 3 shift, the circuitry of FIG. 9*a* would activate the outputs L1, L2 and L3. The use of these activated signals in FIG. 9*b* will be later explained. Another possible shift operation will be for a right shift of two binary bit positions. The circuitry of FIG. 9a would have an active input on the shift amount line labeled 2 and the line labeled RIGHT. As a consequence, outputs R1 and R2 would be activated by the circuits of FIG. 9*a*.

The selection circuitry of FIG. 9*a* has outputs which control the gating circuitry of FIG. 9*b*. When the line L1 is activated, for example, this line indicates that the bit in the high order bit position of each byte must be considered in the determination of the parity after a shift operation. The high order bit of each byte, when line L1 is activated, will be shifted out of a byte in which it originally appears and will appear in the next higher order byte at the output. It can be seen that a shift operation to the left of either 1 2, 3 or 4 bit positions will all involve the high order bit of each byte. As a consequence, the circuitry of FIG. 9*a* activates line L1 whenever a left shift occurs and is not dependent upon the number of binary bit positions involved.

With regards to the output line L3, it can be seen that only shift amounts of 3 or 4 binary bit positions will cause this line to be activated. When line L3 is activated, it means that the next to lowest order bit position of each byte must be considered in determining the parity of each byte after the shift operation. A shift operation of 3 or 4 bit positions to the left will cause the next to lowest bit position to be transferred to the next highest order byte and, for parity purposes, must be considered as being inserted into the next higher order byte position while being removed from its original byte position. A similar analysis would apply to the circuitry of FIG. 9*b* when the right line is activated.

The circuitry of FIG. 9*b* is a selection network which selects, according to the lines activated by the circuitry of FIG. 9*a*, the data bits which must be considered in predicting from the original data and the shift operation what the parity of the resulting shifting data should be. Input lines L1, R1, L2, R2, L3, R3, L4 and R4 correspond to inputs from FIG. 9*a*. Each of these inputs activate certain circuits depending upon which one of the input lines are activated. For example, line L2 might be an activated line. This line would in turn present a signal to AND circuit 9–100. The second input to AND circuit 9–100 is labeled $X_{32}$. This input is represented in the form of $X_{ij}$ where *i* represents the data byte and j represents the data bit within the byte. Thus, $X_{32}$ represents the second data bit within data byte 3 being applied to the input of AND circuit 9–100. Thus, when line L2 is activated, the second bit of byte 3 is passed through AND circuit 9–100 and activates the output labeled $P_{32L}$ and also forms an input to OR circuit 9–102 which in turn activates output $P_{32}$. It also should be noted that data bits $X_{22}$, $X_{12}$, and $X_{02}$ also pass through AND circuits and become outputs $P_{22}$, $P_{12}$ and $P_{02}$.

Each of the outputs of FIG. 9*b* which are labeled with a P and some subscript and form various inputs to the parity modification circuitry of FIG. 9c. At the top of FIG. 9*c* several inputs are shown, namely, $P(B_3)$, $P(B_2)$, $P(B_1)$ and $P(B_0)$. The term $P(B_3)$ represents the original parity bit for the data prior to the shifting operation for byte number 3. The original parity bit must be modified according to the data bits which are shifted out of byte 3 as well as the data bits which are shifted into byte 3. The input $P_{33L}$ represents an input which is equal to the highest order data bit of byte 3 which is shifted out of byte 3 for any given shift operation. The input $P_{23}$ represents the highest order data bit of byte 2 which becomes shifted into byte 3 upon any shift operation. The EXCLUSIVE OR 9–200 performs in accordance with the truth table as shown in FIG. 5a. Thus, if the data bit leaving byte 3 in a shift operation is identical to the data bit entering the byte number 3, the output of EXCLUSIVE OR 9–200 will be a 0. The 0 value then becomes an input to a second EXCLUSIVE OR element 9–202. EXCLUSIVE OR element 9–202 takes the original parity bit of byte 3 and combines it with the information relating to the change caused by a data bit leaving and a data bit entering byte 3. In the case where an of EXCLUSIVE OR 9–200 indicates that the data bit leaving and the data bit entering are of the same binary value, a 0 would be presented to EXCLUSIVE OR 9–202 on line 9–204. Since a 0 occurs on line 9–204, the output of EXCLUSIVE OR 9–202, which is placed on line 9–206, would be identical to the original parity of byte 3.

In the case where the highest order data bit of byte 3 is different from the highest order data bit of byte 2 and a left shift operation is involved, the input to EXCLUSIVE OR 9–200 would be different and thus the output on line 9–204 would have a 1 value according to the truth table shown in FIG. 5*a*. A 1 appearing at the input to EXCLUSIVE OR 9–202 upon line 9–204 would cause the output on line 9–206 to invert the binary value of the original parity bit appearing at input point P $(B_3)$. Thus, the circuitry described would modify the original parity bit in accordance with the data bit entering and the data bit labeling a given byte for a given shift operation. The remainder of the circuitry shown within FIG. 2*c* performs essentially the same functions as has already been described with relation to either right or left shift and in relation to the data bits involved.

Several outputs from the circuitry of FIG. 9C are shown and are labeled as $P'(B_3)$, $P-(B_2)$, $P'(B_1)$ and $P'(B_0)$. These three outputs represent respectively the predicted parity for bytes 3, 2, 1 and 0.

Three other EXCLUSIVE OR circuits are shown and are labeled 9–208, 9–210 and 9–212. These EXCLUSIVE OR circuits have several inputs labeled $P_{33}$, $P_{32}$, $P_{31}$ and $P_{30}$. These inputs represent the data bits which comprise the spill bits from the shifting operation. In addition, EXCLUSIVE OR circuits 9–208, 9–210 and 9–212 represent a conventional parity tree for the determination of the parity for the spill bits. Output P(SP) represents a data bit which is the predicted parity for the spill bits for the given shift operation performed by the ALU should the predicted parity for spill bits be necessary.

It can be seen, therefore, that the circuitry of FIGS. *9a*, *9b* and *9c* represent the required logical circuitry necessary to predict the parity for various shift operations upon data having the structure described. Extending the operation of this circuitry to more data bits and more data bytes will be clear to those of skill in the art. It is also clear that the circuitry herein shown is but one of many possible prediction techniques for predicting the parity of shift operation. It will be clear to those of skill in the art that a predicted parity for shift operations could be calculated by actually performing the shift operation in a different set of logical hardware than the original ALU. The result of the shifting operation would then be passed through appropriate parity trees to generate a separate parity bit for each data byte. This separately developed parity could then be checked against the parity developed in the main ALU of the computing system. This approach is often referred to as the duplication approach wherein the operation is performed by independent hardware and the results compared. Such an approach, however, for operations such as addition, subtraction and shifting is costly because the duplicate hardware necessary is rather expensive.

For logical operations such as AND and OR, the duplication approach is a rather inexpensive means of developing a predicted parity for the present system. The original data appearing in Register A 1–12 and Register B 1–14 of FIG. 1 would be directed to either AND or OR circuits by appropriate gating circuitry. The output of these circuits would then be inputted to appropriate EXCLUSIVE OR trees to develop parity bit for each of the data bytes in the output of the logical operation. These parity bits would then comprise the predicted parity for either AND or OR operations. This approach to the prediction of parity for AND or OR operations is the duplication approach and is well known in the prior art. More elaborate systems of parity prediction for these operations can be generated by those of skill in the art and will perform equally well as an integral part of the parity prediction network 1–30 of FIG. 1 for those operations without altering the scope of intent of this invention.

Referring again to FIG. 1, another extremely important element of present error detection and detection system is the residue predictor 1–54. The residue predictor element is required to take input data from either the data registers or the residue registers and use this data to predict the residue that should result for an arithmetic or logical operation upon the data contained within the data registers. The predicted residue, as has been shown earlier, is utilized in the system to determine, when there are errors, the magnitude of such errors.

For the basic arithmetic operations of addition and subtraction, the residue predictor 1–54 takes on a very simple structure. The residue for addition is determined according to the well known residue equation that the sum of the residues is equal to the residue of the sum. Similarily, for subtraction operations, the difference of the residues represent the residue of the difference.

In order to implement the residue prediction function for add or subtract operations, it is necessary to use a residue adder which will add, in the modulus selected, the residue from residue register $R_A$ 1–50 to the contents of residue Register $R_B$ 1–52. In the case where the modulus is of the form $2^n-1$, the residue adder takes the form of a simple binary adder wherein the carries to binary positions in excess of the uppermost bit position of the selected modulus are wrapped around and added into the lowest order binary bit position. Carries into the second position beyond the high order bit would be wrapped around into the second highest order bit position within the adder and so forth in higher order carries. Such an adder was described in connection with FIG. *7a*.

A simple example would exemplify this operation. Assume that a modulus of 15 is selected and that the residue of one number was 15 and the residue of the second number involved in the addition operation was 3. Thus, the binary number 1111 would be added to the binary number 0011 with the resulting answer of 10010. The high order one is a carry and must be wrapped around to the low order position and added into that low order position. Thus, the number 0010, representing the low four bit of the original answer, must be added to a one in the low order bit position to result in a 0011 answer. Thus, if a number having a residue modulo 15 of 15 is added to a number having a residue modulo 15 of 3, the resulting answer should have a residue modulo of 15 of 3.

For subtraction operations the required operation of the residue predictor is very similar to the operation required for addition. Assume for the moment that a number having a residue modulo 15 of 14 is to have subtracted from it a number having a residue 15 of 3. Applying the residue equation mentioned above, the binary number 1110 (14) would have the number 1100 (complement of 3) added to it to result in a number 11010. The high order 1 represents a carry and should be wrapped around to the low order bit position added to that position. Thus, the number 1010 (the low order four bits of the previous answer) is added to the number 1 to result in a number 1011 (11). The last number (11) represents the residue which should result when a number having a residue modulus 15 of 14 has been subtracted from a number having a residue modulo 15 of 3.

Referring now to FIG. 10, the apparatus is shown for predicting residues for the logical connective operations of AND, OR, or EXCLUSIVE OR. The circuitry shown in FIG. 10 is also usable for the generating predicted residues for add operations. The data required to predict the residue for the above-identified operations is the binary data for the operands as well as the residue for the operands prior to the specific operation. Reg. A 10–10 and Reg. B 10–14 contain the binary data which represent the two quantities for which a given operation is to be performed. This data might be represented in four bytes of data, each containing four data bytes.

The residue for the different operands A and B are contained in residue register $R_A$ 10–12 and residue register $R_B$ 10–16. When the predicted residue described has a modulus of 15, the residue registers would contain four data bit positions each. The specific circuitry will be described particularly for residue operations wherein the modulus of the residue is equal to $2^n-1$, where *n* represents the number of data bits per byte of binary data. It will be recognized by those of skill in the art that a different modulus might be selected, but, for reasons already mentioned, it is desirable to have the residue modulus of the form just mentioned.

The data registers Reg. A 10–10 and Reg. B 10–14 are connected via data busses 10–18 and 10–20 respectively two separate inputs to half adder 10–28. Half adder 10–28 generates the half sum of the two operands. The half sum can be generated by taking the EXCLUSIVE OR of the corresponding bit positions of the data in Reg. A 10–10 and the data in Reg. B 10–14. It will be recognized by those of skill in the art that the arithmetic-logical unit might also be producing a half sum simultaneously in the performance of the particular operation and that a separate half adder circuit might not be necessary. However, since the circuitry is so simple in this case, it is not overly costly to provide a second half adder in the residue prediction circuitry.

The output of the half adder is then placed in the input of residue-calculator 10–30. Residue calculator 10–30 is of the same type as in residue calculator 1–28 shown in FIG. 1 and has already been described in connection with the circuitry shown in FIG. 7*a*. The output of residue calculator 10–30 using the circuitry of FIG. 7*a* would be a residue for the half sum of the two operands contained within Reg. A 10—10 and Reg. B 10–14. This is also the predicted residue for EXCLUSIVE OR operations. The modulus of this half sum residue would be 15. In the case where a different modulus was involved, a different type of residue calculator would be necessary if the modulus was not of the form $2^n-1$.

The output of the residue calculator 10–30 is applied to gate circuitry 10–34. This particular gate circuitry has several unique functions. Gate circuitry 10–34 is not operational whenever an addition operation is being performed. However, when the operation is either OR or EXCLUSIVE OR, gating circuitry 10–34 will gate the output of residue calculator 10–30 unchanged to one of the inputs to residue adder 10–36. In the case where the operation is the logical connective AND, gating circuitry 10–34 complements the data received from residue calculator 10–30 and transmits the complemented data to one input of residue adder 10–36.

The contents of residue register $R_A$ 10–12 and residue register $R_B$ 10–16 are transmitted via data busses 10–22 and 10–24 respectively to residue adder 10–26. A residue adder is a normal binary adder with a wrap around carry feature. In the case where each data input has only four data bits, the output of the residue adder should also have four data bits. When the adder internally generates carries which would appear in the adder output at a bit position of an order of magnitude greater than the highest order output bit position, that bit of carry is wrapped around and added to the lowest order bit position internally. Should the added have a carry into the second bit position beyond the highest ordered output bit position, the carry to that position would be wrapped around and added to the second order bit position internally. Thus, the carries are wrapped around to the lowest order bit positions and added internally to the data generated by the wrap around carry adder. Such an addition process forms the predicted residue for an addition operation. It follows that the output of residue adder 10–26 is equal to the residue of the sum of the two operands within Reg. A 10–10 and Reg. B 10–14 when the modulus is of the form $2^n-1$.

The output of residue adder 10–26 is transmitted directly to gating circuitry 10–32. Gating circuitry 10–32 is operational during add, AND or OR operations. The data from residue adder 10–26 passes directly through gating circuitry 10–32 whenever add, AND or OR operations are defined. Thus, for addition operations the predicted residue is passed through gating circuitry 10–32 to one input residue adder 10–36. Since the second input in residue adder 10–36 would be all 0's where an addition operation is being performed, the output of residue adder 10–36 represents the predicted residue for the addition of the operands in Reg. A 10—10 and Reg. B 10–14. The shift no shift circuitry 10–38 is not operational for an addition operation and the data received from residue adder 10–36 is passed directly through shift/no shift circuitry 10–38 and represents the predicted residue for an addition.

In the case of AND or OR operations, the residue of the sum of the operands is formed in residue added 10–26 and gated through gating circuitry 10–32 to residue adder 10–36. It is combined in residue adder 10–36 with the data received from gating circuitry 10–34 and is outputted to shift/non shift circuitry 10–38. Residue adder 10–36 is the same type adder as residue adder 10–26 and can be manufactured identically.

For the operations of AND or OR operations, shift/no shift circuitry 10–38 shifts the data received from residue adder 10–36 one position to the right and places the spill bit from the right end of the shifting operation to the highest order bit position of the data word at the output of shift/no shift circuitry 10–38. This shifting is required to modify the data so that the output will truly represent the predicted residue for AND or OR operations.

In the case of EXCLUSIVE OR operations, the output of residue calculator 10–30 represents the predicted residue for the EXCLUSIVE OR operation and is transmitted through gating circuitry 10–34 to residue adder 10–36. Since no data is applied to the second input of residue adder 10–36 when an EXCLUSIVE OR operation is being performed, the output of residue adder 10–36 represents the predicted residue for the EXCLUSIVE OR operation. The shift/no shift circuitry 10–38 is non-operational during EXCLUSIVE OR calculations and the predicted residue is passed unshifted to the output of shift/no shift circuitry 10–38. For all operations, the output of shift/no shift circuitry 10–38 in FIG. 10 is applied to the data but 1–60 shown in FIG. 1 and connects to the various elements within the system in accordance with the data bussing as shown in FIG. 1.

FIG. 11 shows two examples of how the circuitry of FIG. 10 operates. Specifically it shows how the circuitry predicts the residue modulo 15 for two assumed operands, A and B, for the logical connective operations of AND and OR. The binary output for the different elements of the system in FIG. 10 are shown and the resulting output of shift/no shift unit 10–38 in FIG. 10 is shown to be the predicted residue modulo 15 for the result of the logical connective operation.

Referring now to FIG. 12, a network is shown for the prediction of the residue for a shifting operation. The circuitry shown in FIG. 12 is circuitry capable of handling the shift operations of data having 8 bits per byte and the residue of that data being calculated in modulo 255. The residue of the data which is to be shifted by the shifting network enters the residue prediction network at input points 12–10 through 12–24 and are labeled $R_0$–$R_7$. This residue corresponds to the residue of the data prior to the shifting operation.

Along the right hand side of the network shown in FIG. 12 are a number of input points labeled X1, X1′, X2, X4, X8, and X16. These numbers correspond to the amount that the data would be multiplied by if it wee shifted (this assumes a left shift). For example, a shift left of two bit positions would amount to a multiplication of the number by two. In such a case, the X1 and X2 line would be activated.

The original residue enters a shifting array of AND circuits which are activated by lines appearing on either line 12–26 or 12–28. When the line on 12–26 is activated, the original residue is transmitted to AND circuits such as AND circuit 12–30 and gated directly onto the shifting array which is enclosed within dotted line 12–42. However, when a shift of at least four bit positions is called for, the line 12–28 is activated. When the shift amount is at least four bit positions, the second row of AND circuits in which AND circuit 12–32 appears are activated and the residue which enters the residue prediction circuitry is shifted end around by four bit positions at the output of the AND circuits in the second row of the network in FIG. 12.

The output of either the first or the second row of AND circuits in the network of FIG. 12 is fed directly to the shifting array within dotted line 12–42. This array allows the shifting of the residue bits by either 0, 1, 2 or 3 data bit positions by the activation of lines 12–34, 12–36, or 12–38 or 12–40 respectively.

A typical output 12–50 of the switching array within dotted line 12–42 enters residue adder 12–48 into the first bit position of residue adder 12–48. The residue adder has three data bits entering each bit position of the adder and is of the type where carries to higher order position are shifted end around so as to be added to the low order bit positions internal to the adder itself. The second input to the residue adder comes from data but 12–44 upon which the complemented residue of the spill bits are entered into residue adder 12–48. Bit number 0 on data bus 12–44 enters bit position 0 at point 12–52 while bit position 6 on data bus 12–44 enters the 6th bit position at point 12–54. By adding the complemented residue of the spill bits, the residue prediction apparatus compensates for the fact that certain bits in the original data word are shifted out of the original data word in the shifting operation.

It follows, therefore, that some compensation should also take place for the data bits which enter the word during the shifting operation. This compensation takes place because of the entry of the residue of the fill bits on data bus 12–46. The 0 bit position of the residue of the fill bits which is transmitted on data bus 12–46 enters the 0 bit position of residue adder 12–48 at point 12–56. Similarly, bit position four on data bus 12–46 enters residue adder 12–48 at the fourth input position 12–58.

The residue adder 12–48 adds the three inputs for each bit position, the first input representing a shifter original residue, the second input representing the complement of the residue of the spill bits and the third input representing the residue of the fill bits. The output of residue adder 12–48 is the predicted residue and is represented by $RP_0$–$RP_7$. A typical data bit, predicted residue bit 0 ($RP_0$) is outputted on line 12–60. This output line 12–60 would form one data bit position upon data bus 1–60 of FIG. 1 when the ALU 1–10 of FIG. 1 was performing a shifting operation.

FIG. 13 shows a table for determining which of the lines entering the network of FIG. 12 should be activated for a given shift operation. A shift right 2 or a shift left 6 would cause the X16 and X4 lines to be activated. Other combinations can be readily determined from this table. If the shift is greater than 7 bit positions, the shift amount should be reduced by 8 until the number of shift positions so calculated is less than 8. The resulting number is used to determine the necessary control lines which must be activated.

While the invention has been particularly shown and described for reference to preferred embodiments thereof, it will be understood by those of skill in the art that the foregoing and other changes in form and details may be made therein without departing from the spirit and scope of the invention.

What is claimed is:

1. An apparatus for detecting and correcting errors in an arithmetic-logical operation in a computing apparatus comprising:

a first and second data register for storing the data bytes upon which the arithmetic-logical operation is to be performed;

a first and second residue register for storing the residue of the data contained in said first and second data register;

an arithmetic-logical unit responsive to said first and second data registers, said arithmetic-logical unit performing an OR function upon the data in said first and second data registers during a first operational mode and said arithmetic-logical unit performing an AND function upon the data in said first and second data registers during a second operational mode, said arithmetic-logical unit producing an output;

a residue calculation means responsive to said arithmetic-logical unit for calculating the residue of the data outputted from said arithmetic-logical unit;

a parity calculator means responsive to said arithmetic-logical unit for calculating the parity of the data outputted from said arithmetic-logical unit;

a parity prediction means responsive to said first and second data registers to predict the parity of the output of said arithmetic-logical unit;

a first residue adder responsive to said first and second residue registers for adding the residues of the operands upon which said arithmetic-logical operation is being performed by said arithmetic-logical unit, said first residue adder producing an output;

a half adder means responsive to said first and second data registers for forming the half sum of the data contained within said first and second data registers;

a half sum residue calculation means responsive to said half adder means for calculating the residue of said half sum;

a functional gating means having an input and output, said functional gating means being responsive to said half sum residue calculation means and performing during said first operational mode the transfer of data from said input to said output of said functional gating means and performing during said second operational mode the complementing of the data at said input and placing said complemented data upon said output of said functional gating means;

a second residue adder means responsive to the output of said first residue adder means and responsive to said output of said functional gating means to produce an uncorrected predicted residue;

a shifter means responsive to said uncorrected predicted residue for shifting said uncorrected predicted residue and producing an output which is representative of the predicted residue for said arithmetic-logical operations;

an error detection means responsive to said parity prediction means and said parity calculation means for determining the data byte at the output of said arithmetic-logical unit in which an error occurred;

an error magnitude calculator means responsive to said residue calculation means and said shifter means for determining the difference between said predicted and said actual residue and determining the arithmetic sign of said difference; and an error correction means responsive to said arithmetic-logical unit, said error detection means, said error magnitude calculator means to adjust the data byte in error indicated by said parity comparison means by the magnitude and sign indicated by said error magnitude calculation means.

2. An apparatus for predicting the residue for logical connective operations upon two operands comprising:

a first and second operand register for storing the operands upon which the logical connective is to be performed;

a first and second residue register for storing the residue of said operands contained in said first and second operand registers;

a half adder means responsive to said first and second operand registers for generating the half sum of said operands;

a residue calculation means responsive to said half sum adder means for producing the residue of said half sum;

a first residue adder means responsive to said first and second residue registers for adding the residues of said operands on which said logical connective function is to be performed, said first residue adder means producing an output;

a functional gating means operational during a first mode, said first mode being activated by the logical connective AND, to complement the output of said half sum residue calculation means and pass said complemented half sum residue to the output of said functional gating means, said functional gating means being operational during a second mode, said second mode being activated by the logical connective OR, to gate the output of said half sum residue calculation means to the output of said functional gating means;

a second residue adder means responsive to said first residue adder output and said output of said functional gating means, said second residue adder means producing a sum containing the same number of data bits as each of said inputs to said second residue adder means; and a shifter means responsive to said second residue adder means for correcting the output of said second residue adder means to produce an output of said shifter means which equals the predicted residue for the logical connective being performed upon said operands.

3. An apparatus for detecting and correcting errors in an arithmetic-logical operation in a computing apparatus comprising:

a first and second data register for storing the data in bytes on which the arithmetic-logical operation is to be performed;

a first and second residue register for storing the residue of the data contained in said first and second data registers;

an arithmetic-logical unit responsive to said first and second data registers for performing an OR function on the data in said first and second data registers and outputting the result of said OR function;

a residue calculation means responsive to said arithmetic-logical unit for calculating the residue of the data outputted from said arithmetic-logical unit;

a parity calculator means responsive to said arithmetic-logical unit for calculating the parity of the data outputted from said arithmetic-logical unit;

a parity prediction means responsive to said first and second data registers to predict for said OR function the parity of the output of said arithmetic-logical unit;

a first residue adder means responsive to said first and second residue registers for adding the residues of the operands upon which said OR function is being performed by said arithmetic unit, said first residue adder producing an output;

a half adder means responsive to said first and second data registers forming half sum of the data contained within said first and second data registers;

a second residue calculation means responsive to said half sum adder means for producing an output representative of the residue of said half sum;

a second residue adder means responsive to the output of said first residue adder means and said second residue calculation means to produce an uncorrected predicted residue;

a shift means responsive to said uncorrected predicted residue for shifting said uncorrected predicted residue and producing an output which is representative of the predicted residue for said OR function;

an error detection means responsive to said parity prediction means and said parity calculation means for determining the data byte at the output of said arithmetic-logical unit in which an error occurred;

an error magnitude calculator means responsive to said first residue calculation means and said shifter means for determining the difference between said predicted and said actual residue and determining the arithmetic sign of said difference; and an error correction means responsive to said arithmetic-logical unit, said error detection means, and said error magnitude calculator means to adjust the data byte in error indicated by said parity comparison means by the magnitude and sign indicated by said error magnitude calculator means.

4. An apparatus for detecting and correcting errors in an arithmetic-logical operation within a computing apparatus comprising:

a first and second data register for storing the data in bytes upon which the arithmetic-logical operation is to be performed;

a first and second residue register for storing the residue of the data contained in said first and second data registers;

an arithmetic-logical unit responsive to said first and second data registers for performing an AND function upon the data in said first and second data registers and outputting the result of said AND function;

a first residue calculation means responsive to said arithmetic-logical unit for calculating the residue of the data outputted from said arithmetic-logical unit;

a parity calculator means responsive to said arithmetic-logical unit for calculating the parity of the data outputted from said arithmetic-logical unit;

a parity prediction means responsive to said first and second data registers to predict for said AND function the parity for the output of said arithmetic-logical unit;

a first residue adder responsive to said first and second residue registers for adding the residues of the data upon which said AND function is being performed by said arithmetic-logical unit, said first residue adder producing an output;

a half adder means responsive to said first and second data registers performing the half sum of the data contained within said first and second data registers;

a second residue calculation means responsive to said half adder means for calculating the residue of said half sum;

a complementing means, responsive to said second residue calculation means to produce an output represented of the complement of said residue of said half sum;

a second residue adder means responsive to the output of said first residue adder means and responsive to the output of said complementing means to produce an uncorrected residue;

a shifter means responsive to said uncorrected predicted residue for shifting uncorrected predicted residue and producing an output which is representative of the predicted residue for said AND function;

an error detection means responsive to said parity prediction means and said parity calculation means for determining the data byte at the output of said arithmetic-logical unit in which an error occurred;

an error magnitude calculator means responsive to said first residue calculation means and said shifter means for determining the difference between said predicted and said actual residue and determining the arithmetic sign of said difference; and an error correction means responsive to said arithmetic-logical unit, said error detection means, and said error magnitude calculator means to adjust the data byte in error as indicated by said parity comparison means by the magnitude and sign indicated by said error magnitude calculator means.

5. A method of predicting the residue for a logical connective operation upon two date words comprising of the steps of:

generating signals representative of the sum of the residue of the two data words;

generating the half sum of the two data words in a half summing apparatus;

calculating from said half sum the residue of said half sum;

complementing the calculated residue of said half sum;

performing the residue addition of said complemented residue of said half sum and said residue sum to produce an uncorrected predicted residue; and correcting said uncorrected predicted residue by shifting said uncorrected predicted residue to produce a predicted residue for the results of the AND logical connective upon said two data words.

6. A method of predicting the residue for OR operation upon two data words comprising the steps of:

generating signals representative of the sum of the residue of the two data words;

generating the half sum of the two data words in a half summing apparatus;

calculating the residue of said half sum;

performing the residue addition of said residue of said half sum and said residue sum to produce an uncorrected predictive residue; and correcting said uncorrected predicted residue by shifting uncorrected predicted residue to produce a predicted residue for the result of the OR logical connective upon said two data words.

* * * * *